United States Patent
Dai

(10) Patent No.: US 9,129,269 B2
(45) Date of Patent: Sep. 8, 2015

(54) SECURED POINT-OF-SALE TRANSACTION SYSTEM

(75) Inventor: Xia Dai, San Jose, CA (US)

(73) Assignee: Xia Dai, San Jose, CA (US)

( * ) Notice: Subject to any disclaimer, the term of this patent is extended or adjusted under 35 U.S.C. 154(b) by 520 days.

(21) Appl. No.: 13/018,393

(22) Filed: Jan. 31, 2011

(65) Prior Publication Data

US 2011/0191252 A1 Aug. 4, 2011

Related U.S. Application Data

(60) Provisional application No. 61/300,685, filed on Feb. 2, 2010.

(51) Int. Cl.
*G06Q 20/00* (2012.01)
*G06Q 20/10* (2012.01)
*G06Q 20/20* (2012.01)
*G06Q 20/38* (2012.01)

(52) U.S. Cl.
CPC ............... *G06Q 20/10* (2013.01); *G06Q 20/20* (2013.01); *G06Q 20/3829* (2013.01)

(58) Field of Classification Search
USPC .......................................................... 705/71
See application file for complete search history.

(56) References Cited

U.S. PATENT DOCUMENTS

| | | | |
|---|---|---|---|
| 5,832,458 A * | 11/1998 | Jones | 705/14.26 |
| 2007/0022058 A1 * | 1/2007 | Labrou et al. | 705/67 |
| 2008/0011825 A1 | 1/2008 | Giordano et al. | |
| 2008/0091616 A1 | 4/2008 | Helwin et al. | |
| 2009/0171939 A1 | 7/2009 | Athsani et al. | |
| 2009/0206157 A1 | 8/2009 | Heffez et al. | |

FOREIGN PATENT DOCUMENTS

EP 930590 A1 * 7/1999 ............. G07F 19/00

* cited by examiner

*Primary Examiner* — James A Reagan
(74) *Attorney, Agent, or Firm* — Silicon Valley Patent Group LLP; Thomas C. Chan

(57) ABSTRACT

The present invention relates to a secured transaction system. In one embodiment, a point-of-sale (POS) system includes an input module configured to receive a transaction description from a mobile client device, an encryption engine configured to generate an encrypted transaction description using the transaction description from the mobile client device, and a communication module configured to transmit the encrypted transaction description for processing.

18 Claims, 16 Drawing Sheets

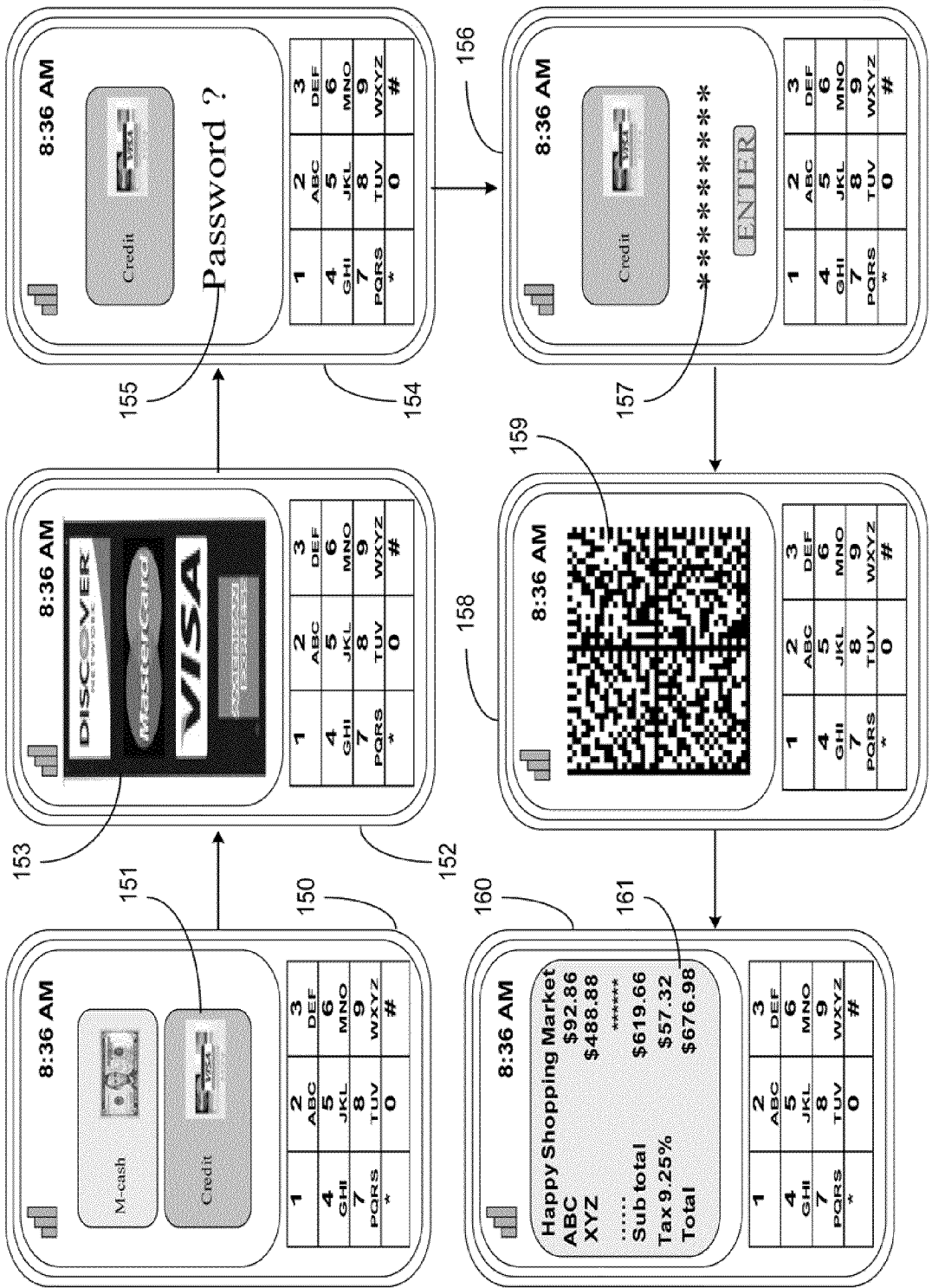

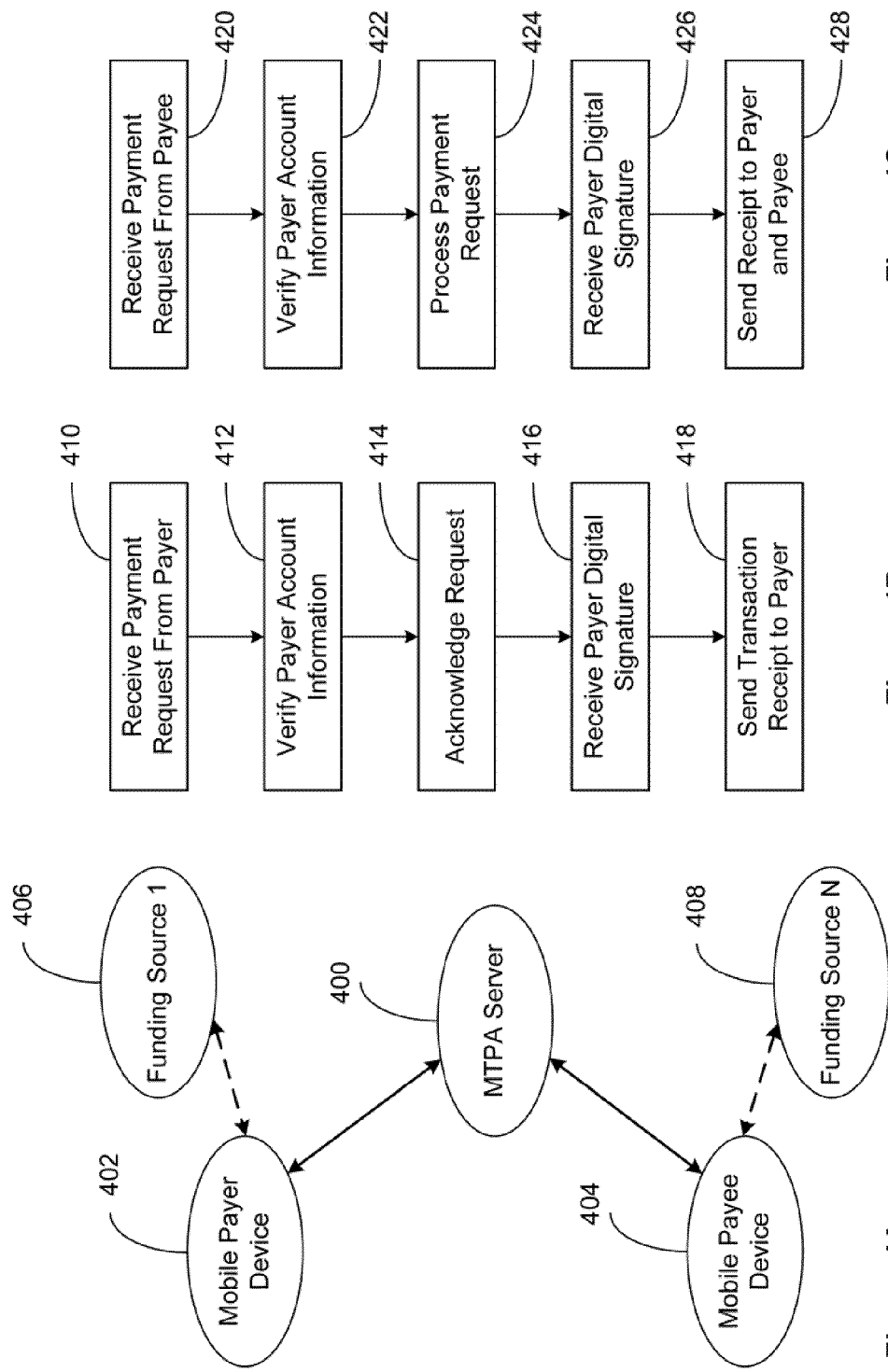

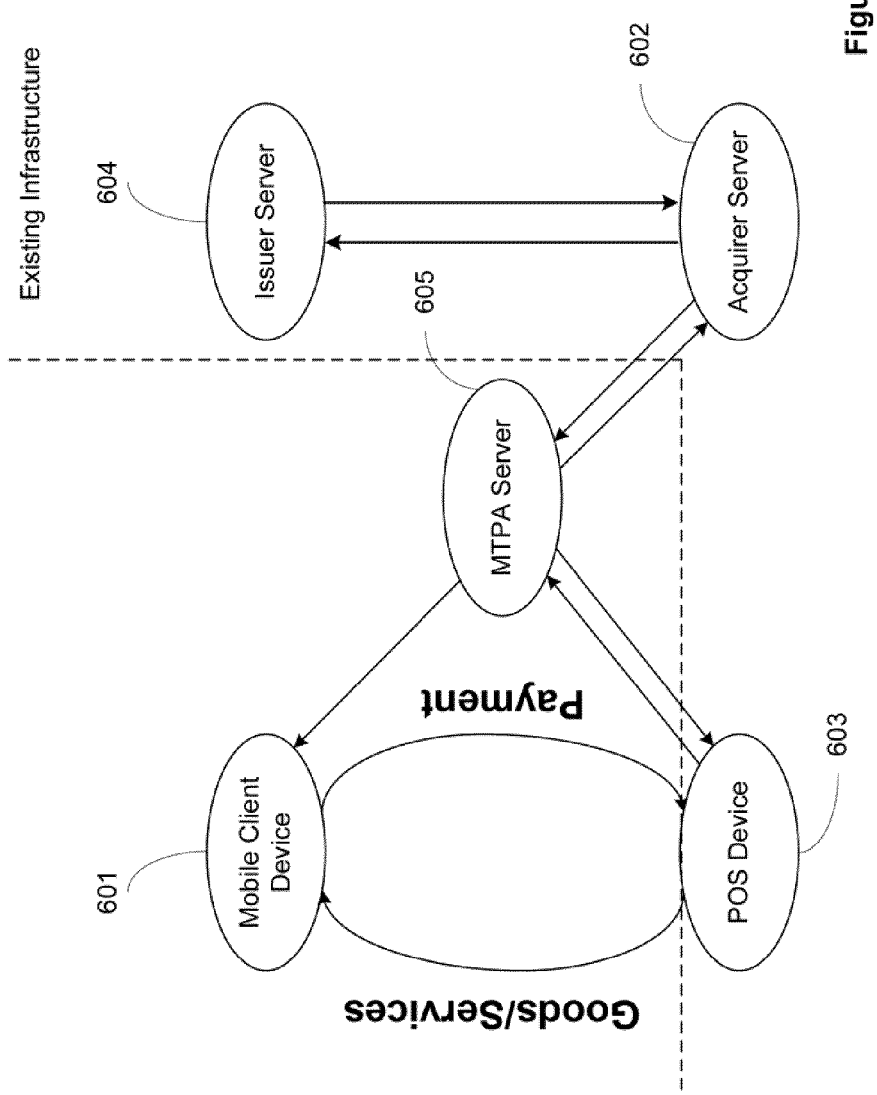

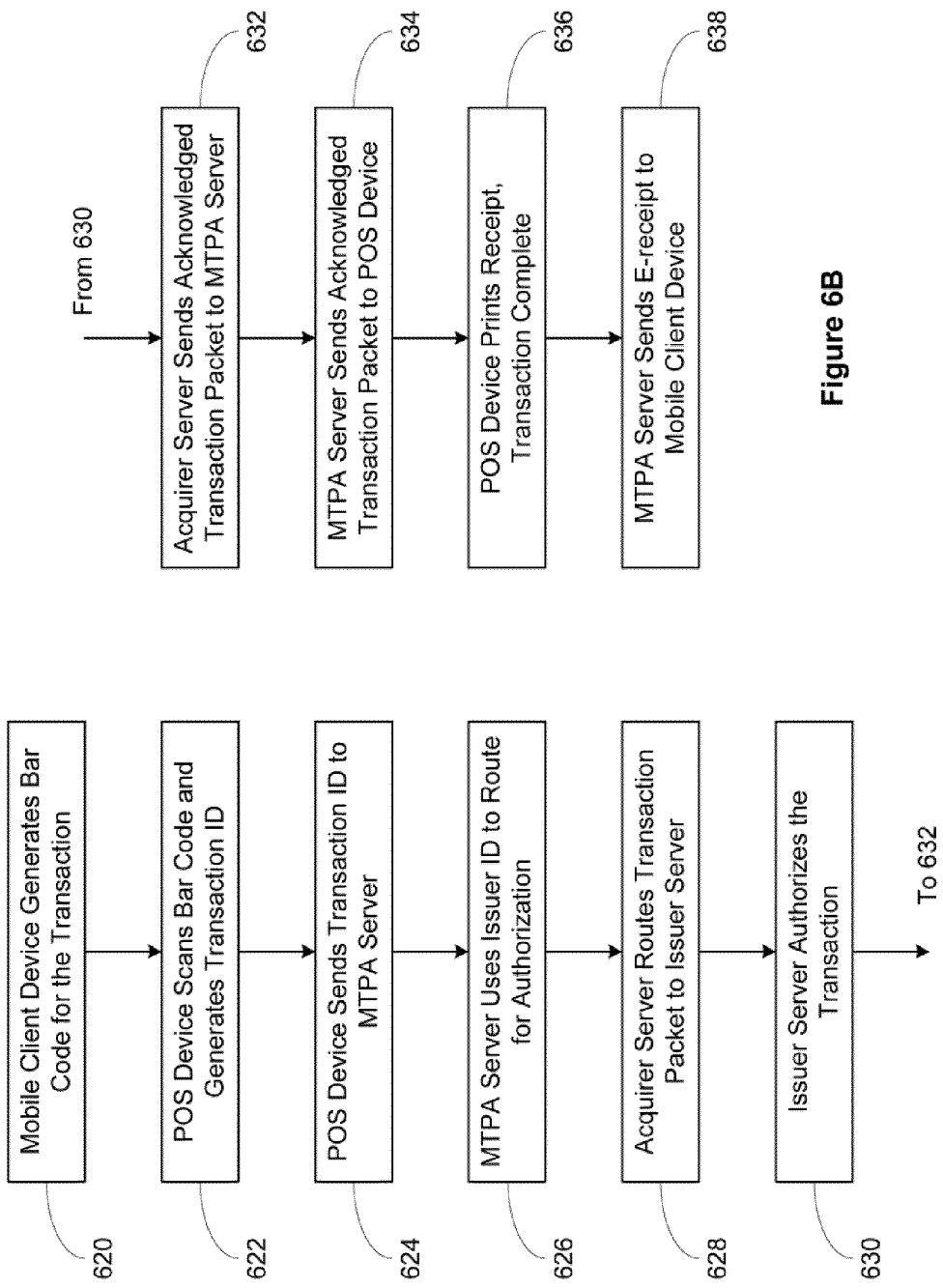

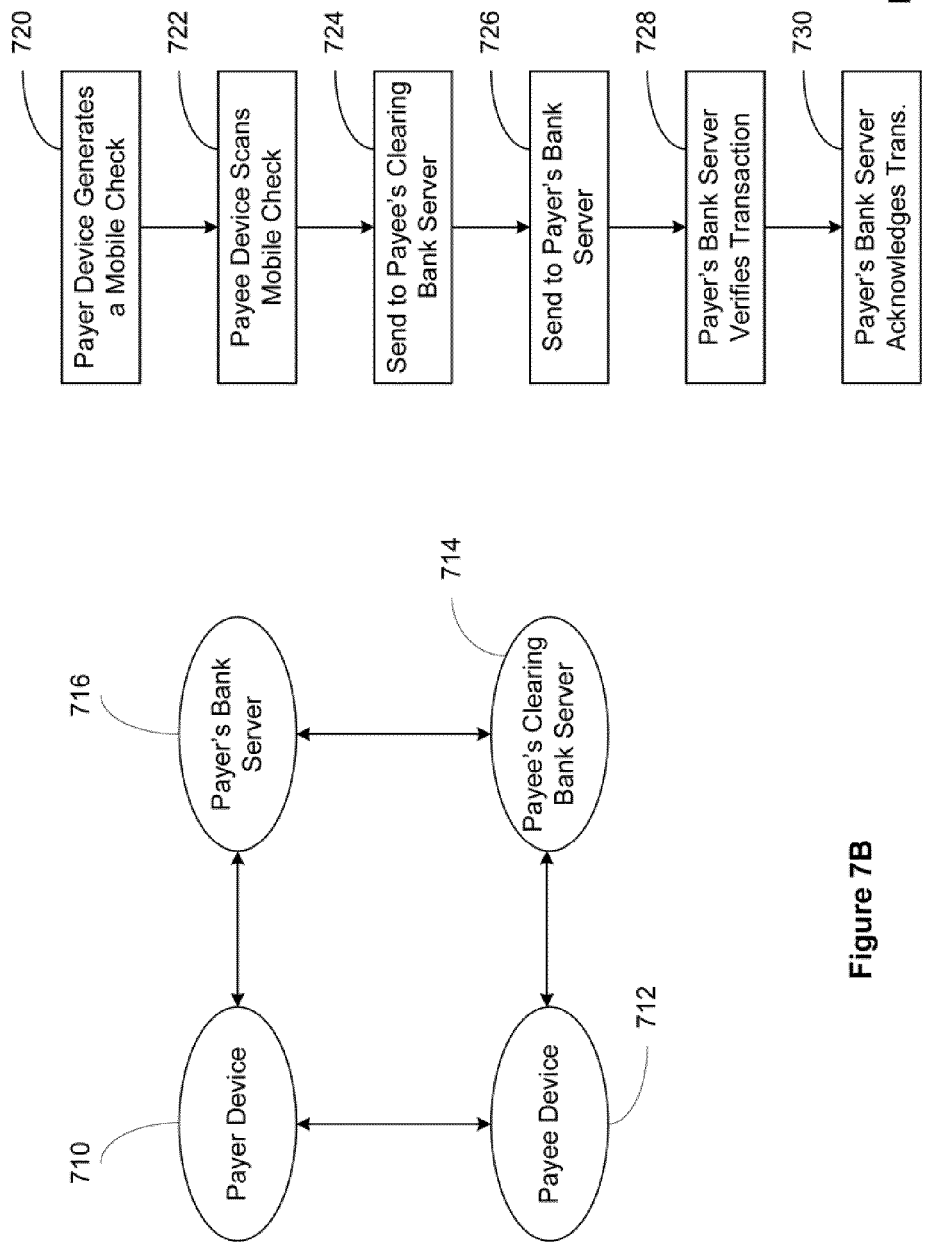

| Transaction Date | Post Date | Reference Number | Description of Transaction | POS GPS Location | Amount |
|---|---|---|---|---|---|
| 1/20 | 1/20 | X123456a1 | Company A, Milpitas, CA | 37°26'5"N 121°53'42"W | $32.00 |
| 1/22 | 1/22 | W123456b2 | Company B, Santa Clara, CA | 37°21'16"N 121°58'9"W | $157.84 |
| ... | ... | ... | ... | ... | ... |
| 1/28 | 1/28 | Q123456x3 | Company L, Las Vegas, NV | 36°10'30"N 115°08'11"W | $277.38 |
| 1/31 | 1/31 | Y123456d4 | Company M, Palo Alto, CA | 37°25'21"N 122°9'55"W | $33.48 |

Figure 8

SECURED POINT-OF-SALE TRANSACTION SYSTEM

CROSS REFERENCE TO RELATED APPLICATIONS

This application claims the benefit of U.S. provisional application No. 61/300,685, "A Secured Point-Of-Sale Transaction System" filed Feb. 2, 2010. The aforementioned United States application is hereby incorporated by reference in its entirety.

FIELD OF THE INVENTION

The present invention relates to the field of electronic commerce. In particular, the present invention relates to systems and methods for handling secured transactions.

BACKGROUND OF THE INVENTION

In commerce, there are numerous ways for buyers and sellers to exchange money for goods and services. One commonly used conventional method is that a buyer pays cash to a seller. There are several problems with this payment method. First, if a transaction is large, it would be hard for both the buyer and seller to handle a large amount of cash, for example for transactions over a few thousand dollars. Besides the need to provide exact changes, doing transactions in cash would require more efforts in book keeping for both buyers and sellers. In addition, the parties may be exposed to the risk of counterfeiting as well as theft or robbery.

Another commonly used conventional method is that the buyer writes a check to the seller. However, this method of payment also has several drawbacks. First, it is inconvenient for the buyer to carry a check around, and it is also inconvenient for the seller to deposit the check to a bank every time he receives a check. In addition, the buyer may be concerned with the risk of lost checks and the seller may be exposed to the risk of counterfeit checks. If a check has bounced, which means insufficient fund in the buyer's bank, it may cost additional money and effort for both the buyer and seller to fix the problem.

Yet another commonly used conventional method is that the buyer pays with a credit or debit card. However, there are numerous problems associated with this payment method. To the buyer, it is inconvenient to carry multiple cards and many merchants do not accept credit cards if the transaction amount is relatively small, such as less than $20. In addition, if the credit cards are lost or stolen, it would cause stress and effort for the card holder to inform the issuing bank and have the cards replaced, and it would cost the issuing bank to create and mail a replacement card to the card holder. Furthermore, the credit/debit card numbers are static, which do not change within their corresponding expiration dates. Such static card numbers may be stolen during online transactions without card owner's knowledge. Furthermore, a record breach at merchant sites or at issuing banks would create tremendous financial risks to the card holders, merchants, and/or the issuing banks.

Therefore, there is a need for systems and methods that can address the problems of the conventional payment methods and assist buyers and sellers doing transactions in electronic commerce.

SUMMARY

The present invention relates to a secured transaction system. In one embodiment, a mobile client device includes a mobile client device includes a user interface configured to enable a user to select a transaction type and collect a user pin number, a processor configured to generate a secured transaction description using the transaction type and the user pin number, wherein the secured transaction description includes issuer ID, account ID, merchant ID, password, transaction amount, and transaction time stamp, and the processor is further configured to transmit the secured transaction description to a mobile processing agent for processing, and receive a transaction record from the mobile transaction processing agent, and a memory configured to store the transaction record in the mobile client device.

In another embodiment, a computer implemented method for generating a transaction from a mobile client device includes selecting a transaction type, collecting a user pin number, generating a secured transaction description dynamically using the transaction type and the user pin number, wherein the secured transaction description includes issuer ID, account ID, merchant ID, password, transaction amount, and transaction time stamp, and transmitting the secured transaction description to a mobile transaction processing agent for processing.

In yet another embodiment, a point-of-sale (POS) system includes an input module configured to receive a transaction description from a mobile client device, an encryption engine configured to generate an encrypted transaction description using the transaction description from the mobile client device, and a communication module configured to transmit the encrypted transaction description for processing.

In yet another embodiment, a computer implemented method for processing secured transactions includes receiving a transaction description from a mobile client device, generating an encrypted transaction description using the transaction description from the mobile client device, and transmitting the encrypted transaction description for processing.

In yet another embodiment, a mobile transaction processing agent system includes a communication module configured to receive a secured transaction description from a mobile client device or an encrypted transaction description from a point-of-sale (POS) device, wherein the secured transaction description is in the form of a bar code generated by the mobile client device, an authentication module configured to decode the secured transaction description and verify the secured transaction description is valid based on the mobile client device or the point-of-sale device, and a transaction processing module configured to process the transaction in accordance with the secured transaction description.

In yet another embodiment, a computer implemented method for processing secured transactions includes receiving a payment request, wherein the payment request includes a transaction description, verifying payer account information in association with the payment request, processing the payment request upon verifying the payer account information, receiving a digital signature from the payer, adjusting the payer account with the transaction amount upon authenticating the transaction with the received digital signature, and sending a transaction receipt to the payer.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 1D illustrates another series of user interfaces corresponding to a transaction described in FIG. 1B on the mobile device according to embodiments of the present invention.

FIGS. 4A-4C illustrate applications of a mobile transaction processing agent according to embodiments of the present invention.

FIGS. 6A-6B illustrate yet another system for deploying mobile client, POS device, and MTPA with existing financial infrastructures according to embodiments of the present invention.

FIGS. 7A-7C illustrate implementations of processing a mobile check according to embodiments of the present invention.

FIG. 8 illustrates a method of security enhancement and book keeping according to embodiments of the present invention.

DESCRIPTION OF EMBODIMENTS

Method and system are provided for handling secured transactions. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
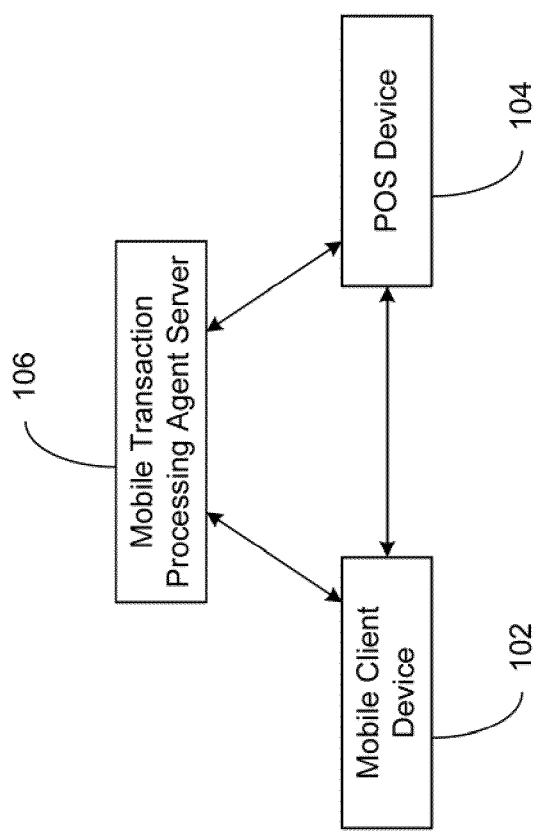
FIG. 1A illustrates a system for processing transactions between a buyer and a seller using mobile device according to embodiments of the present invention.

FIG. 1A illustrates a system for processing transactions between a buyer and a seller using mobile device according to embodiments of the present invention. As shown in FIG. 1A, the system includes a mobile client device 102 (also referred to as mobile device or mobile client for short) possessed by the buyer. The mobile client device 102 includes, but not limited to, cellular phone, Personal Digital Assistant (PDA) device, tablet PC, or other portable devices. The system also includes a point-of-sale (POS) device 104, which is typically a check-out station, a cash register, or other types of transaction processing system at a merchant site. The system further includes one or more mobile transaction processing agent (MTPA) servers 106 (a MTPA server is also referred to as mobile transaction processing system), which is configured to communicate with the mobile device 102 and the POS device 104, either directly or indirectly via other computer networks and/or computer servers.

Figure 1B:
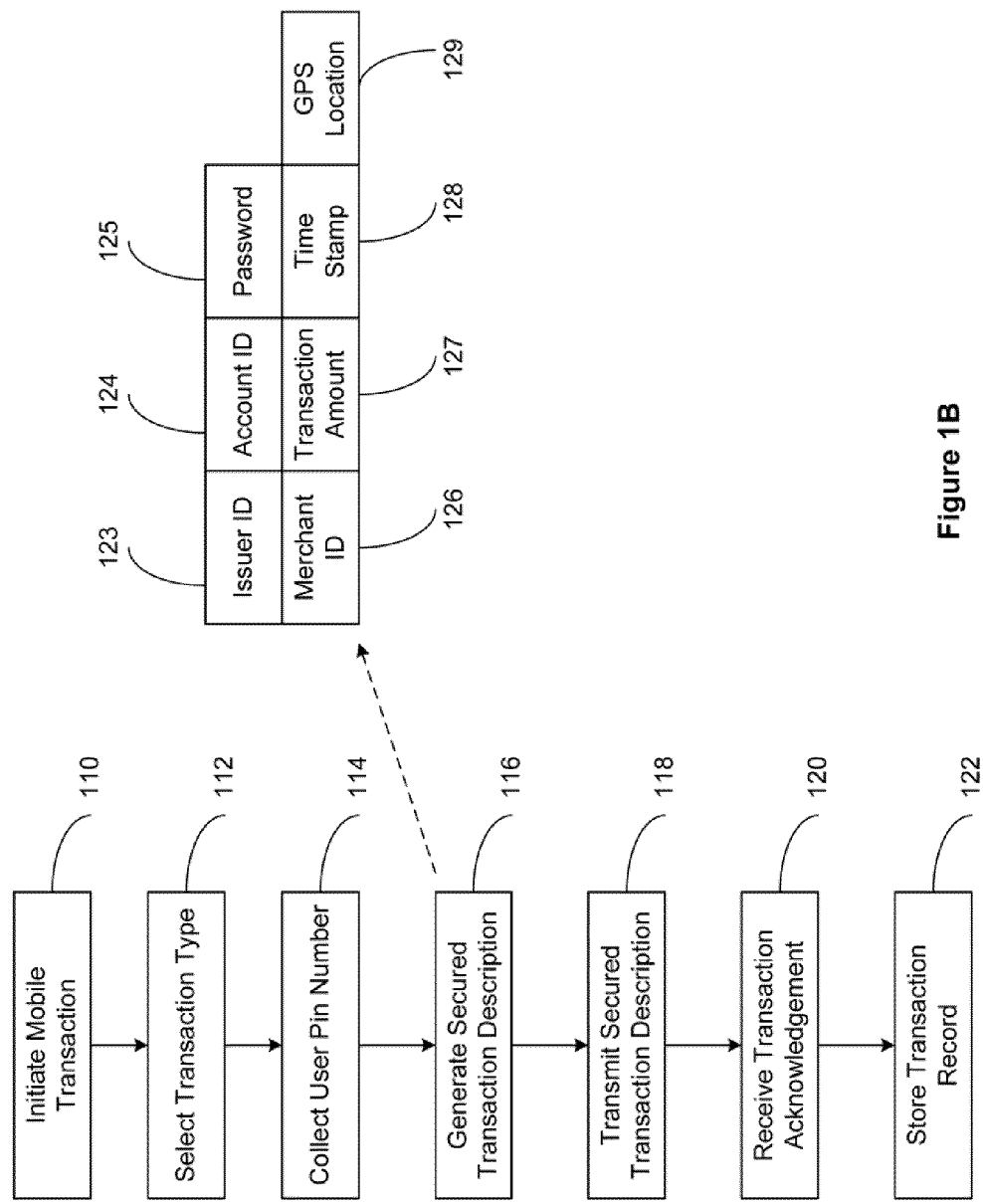
FIG. 1B illustrates a flow chart describing processing a transaction with a mobile device according to embodiments of the present invention.

FIG. 1B illustrates a flow chart that describes processing a transaction with a mobile device according to embodiments of the present invention. En the example shown in FIG. 1B, a mobile device receives a triggering event to initiate a mobile transaction in block 110. The triggering event may be generated by a user by pressing a preprogrammed button of the mobile device 102. In block 112, the mobile device prompts the user to select a transaction type. For example, one exemplary transaction type is mobile-cash (M-cash), which may be a debit account the user has established with the MTPA or with another financial institution and the MTPA is authorized to withdraw user-prescribed funds from the account. Another exemplary transaction type is mobile-credit (M-credit), which may be a credit account the user has established with the MTPA or with another financial institution and the MTPA is authorized to withdraw user-prescribed funds from the account. In block 114, the mobile device collects user information to ensure the user is authorized to conduct transaction. In one approach, the mobile device may prompt the user to enter a pin number. The mobile device then compares the pin number entered by the user to an authorized pin number stored in the device. If an invalid pin number is entered, the mobile device may allow the user to try to enter the pin number again for a few times before terminating the transaction. If the user enters a valid pin number, the mobile device moves on to the next stage of the transaction.

In block 116, based on the information preinstalled in the mobile device and the information entered by the user during the transaction, such as the pin number and the transaction amount, the mobile device generates a secured transaction description dynamically. The secured transaction description may include issuer ID 123, account ID 124, user password 125, merchant ID 126, transaction amount 127, and transaction time stamp 128. The secured transaction description may be in the form of a scrambled bar code or in the form of a scrambled two dimensional pattern containing the transaction information described above.

According to embodiments of the present invention, the account ID 124 field is dynamic and scrambled, and the MTPA has the keys to decrypt the scrambled account ID 124. The account ID 124 may be updated according to a predetermined period of time, such as every day, every week, or randomly. The updating field value may like updating enigma code, which makes it harder to crack by hackers. In the event the mobile client device is lost or the account ID is breached, the account ID may be easier to change, for example by a mobile network operator. The transaction time stamp 128 incorporates the time of the transaction and facilitates record keeping. Besides, this field makes all transaction IDs (also referred to as transaction description) unique and different from each other. This is because each end user may only make one transaction at any given place and time.

In block 118, the mobile device transmits the secured transaction description to the MTPA server. According to various implementations of the present invention, the transmission of the secured transaction description may be carried out wirelessly from the mobile device to the MTPA servers. Alternatively, the transmission of the secured transaction description may be done via the POS device and then transmitted through a wired network or wirelessly from the POS device to the MTPA servers. In block 120, upon verification and approval of the transaction by the MTPA servers, the mobile device receives an acknowledgement of the transaction from the MTPA servers. The acknowledgement may include a confirmation number, transaction amount, time and date of the transaction, name of the seller, and remaining balance on the M-cash account. Similar to block 118, the mobile device may receive the acknowledgement wirelessly from the MTPA servers, or from the MTPA servers via the POS device. In block 122, the mobile device stores a record of the transaction either on the device or sending the record to a remote folder specified by the user.

Figure 1C:
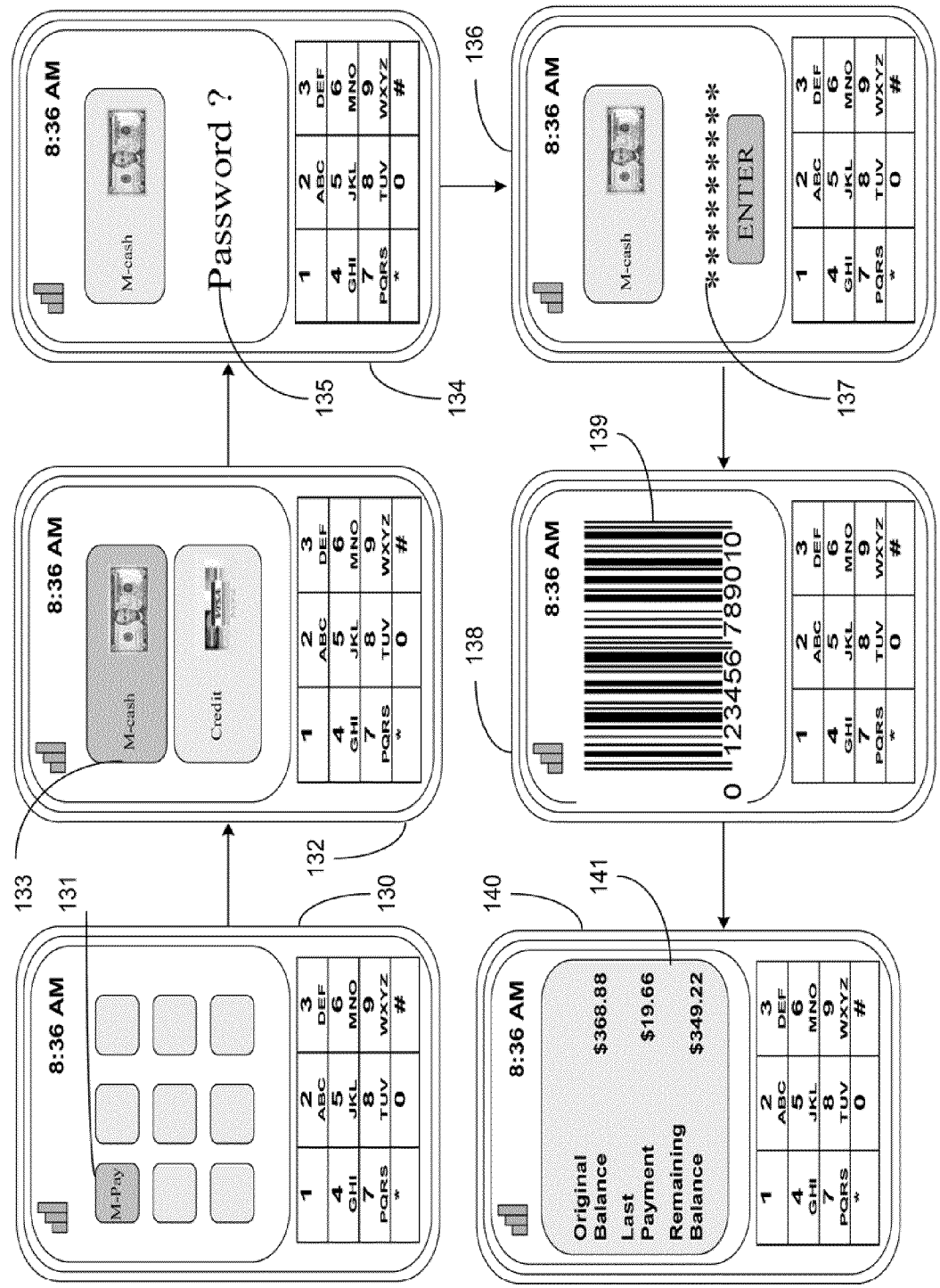
FIG. 1C illustrates a series of user interfaces corresponding to a transaction described in FIG. 1B on the mobile device according to embodiments of the present invention.

FIG. 1C illustrates a series of user interfaces corresponding to a transaction described in FIG. 1B on the mobile device according to embodiments of the present invention. In one approach, screen 130 may be configured to implement block 110 where the mobile client device prompts a user to press the M-Pay button 131 to initiate a mobile transaction. Screen 132 may be configured to implement block 112 where the mobile client device prompts a user may choose a transaction type. For example, the transaction type M-cash 133 may be selected. Screens 134 and 136 implement the block 114 where the mobile device requests the user to enter a password 135; and a masked password 137 is entered by the user. In screen 138, a secured transaction description is generated by the mobile client device, which corresponds to the function performed in block 116 of FIG. 1B. The secured transaction description may be read from the mobile client device or be transmitted from the mobile client device in accordance with the function performed in block 118 of FIG. 1B.

In this implementation, the secured transaction description is a scrambled bar code 139 that includes information of issuer ID 123, account ID 124, user password 125, merchant ID 126, transaction amount 127, and time stamp 128. Note that this secured transaction description is generated dynamically as opposed to a static description of transaction information as in the cases of credit card transactions or transactions involving checks. The secured transaction description 139 is unique not only because it includes the user password in addition to the issuer ID, account ID, and merchant ID, it also includes the transaction amount which typically varies based on the item being purchases, and the time stamp which changes constantly. One of the benefits of the secured transaction description over the conventional transaction description is that it may be used only once and the risk of this information being stolen is significantly reduced. Unlike credit card information and bank account information shown on a check, once they are stolen, they may be used repeatedly by criminals.

In yet another embodiment of the present invention, the secured transaction description may further include the global positioning system (GPS) location 129 of the mobile client device, which further contributes to the security of the transaction. In this case, if the criminals do not have or do not know the GPS location of the mobile client device, they would not be able to generate the secured transaction description and thus would not be able to complete any fraudulent transaction. According to embodiments of the present invention, location based fraud detection may be implemented using mobile client device location tracking or GPS technologies. In one implementation, every mobile payment may be monitored by comparing the transaction location (for example GPS terminal location) against the location of the mobile client device, which may be obtained, for example by a mobile network operator, through mobile client location tracking technologies. In this approach, the POS ID may be forwarded to MTPA along with the transaction ID, and the mobile client location may be obtained from the mobile network operator for comparison. When there is a mismatch, a fraud alert will be generated and the transaction is declined.

In screen 140, a transaction acknowledgment 141 is received by the mobile client device. In this particular example, the transaction acknowledgement includes information about the user's account, such as the original balance, the last payment amount, and the remaining balance. The mobile device may be configured to store a record of the transaction or wirelessly transmit this record to a remote storage location. Screen 140 corresponds to the functions performed in blocks 120 and 122 of FIG. 1B.

FIG. 1D illustrates another series of user interfaces corresponding to a transaction described in FIG. 1B on the mobile device according to embodiments of the present invention. Similar to the example described in FIG. 1C, screen 150 may be configured to implement block 112 where the mobile client device prompts a user to choose a transaction type. For example, the transaction type M-credit 151 may be selected. Upon receiving a selection by the user, in screen 152, the mobile client device displays types of credit cards may be used to carry out the transaction, including but not limit to Discover, MasterCard, VISA, and American Express.

Screens 154 and 156 implement the block 114 where the mobile device requests the user to enter a password 155; and a masked password 157 is entered by the user. In screen 158, a secured transaction description is generated by the mobile client device, which corresponds to the function performed in block 116 of FIG. 1B. The secured transaction description may be read from the mobile client device or be transmitted from the mobile client device in accordance with the function performed in block 118 of FIG. 1B.

In this implementation, the secured transaction description is a scrambled multi-dimensional bit map 159 that includes information of issuer ID 123, account ID 124, user password 125, merchant ID 126, transaction amount 127, time stamp 128, and GPS location 129. Note that this secured transaction description is generated dynamically as opposed to a static description of transaction information as in the cases of credit card transactions or transactions involving checks. The secured transaction description 159 is unique not only because it includes the user password in addition to the issuer ID, account ID, and merchant ID, it also includes the transaction amount which typically varies based on the item being purchases, the time stamp which changes constantly, and the GPS location of the mobile device which may also change. One of the benefits of the secured transaction description over the conventional transaction description is that it may be used only once and the risk of this information being stolen is significantly reduced. Unlike credit card information and bank account information shown on a check, once they are stolen, they may be used repeatedly by criminals.

In screen 160, a transaction acknowledgment 161 is received by the mobile client device. In this particular example, the transaction acknowledgement includes a list of items purchased at the Happy Shopping Market, the subtotal amount of the purchase, the sales tax, and the total amount of the purchase. The mobile device may be configured to store a record of the transaction or wirelessly transmit this record to a remote storage location. Screen 160 corresponds to the functions performed in blocks 120 and 122 of FIG. 1B.

There are numerous advantages associated with the transaction processing system described in FIGS. 1A-1D. One advantage is that an active mobile client device is a secured ID device for authentication purposes. This is because an active mobile client device is most likely to have a unique phone number and a unique user. Mobile client devices are ubiquitous and have the largest user base among all electronic devices. They are mostly likely to be always on, always connected, and always with the users. Mobile client devices may be configured to work with Short Message Service (SMS) real time feedback for monitoring account activities. Moreover, mobile client devices may be configured to provide location based fraud detection using triangular cell positioning or GPS technologies, and they can implement strong security features, such as two- or three-factor authentication.

In addition, an active mobile client device offers dynamic account ID that may be used to guard against fraud from credit/debit transaction record breach. For example, mobile client devices can store credit/debit account ID that is provisioned over the air (by a mobile network operator), with security protocol guarding confidentiality and various update algorithm applied (regular, random, or situation based). Mobile client devices may be configured to scramble credit/debit account ID with random numbers and/or time stamps. Furthermore, Mobile client devices may be configured to apply security protocols, such as random number generator, message authentication code (MAC), digital signature, public key infrastructure (PKI), etc., which add additional security in the authentication process.

Figure 2A:
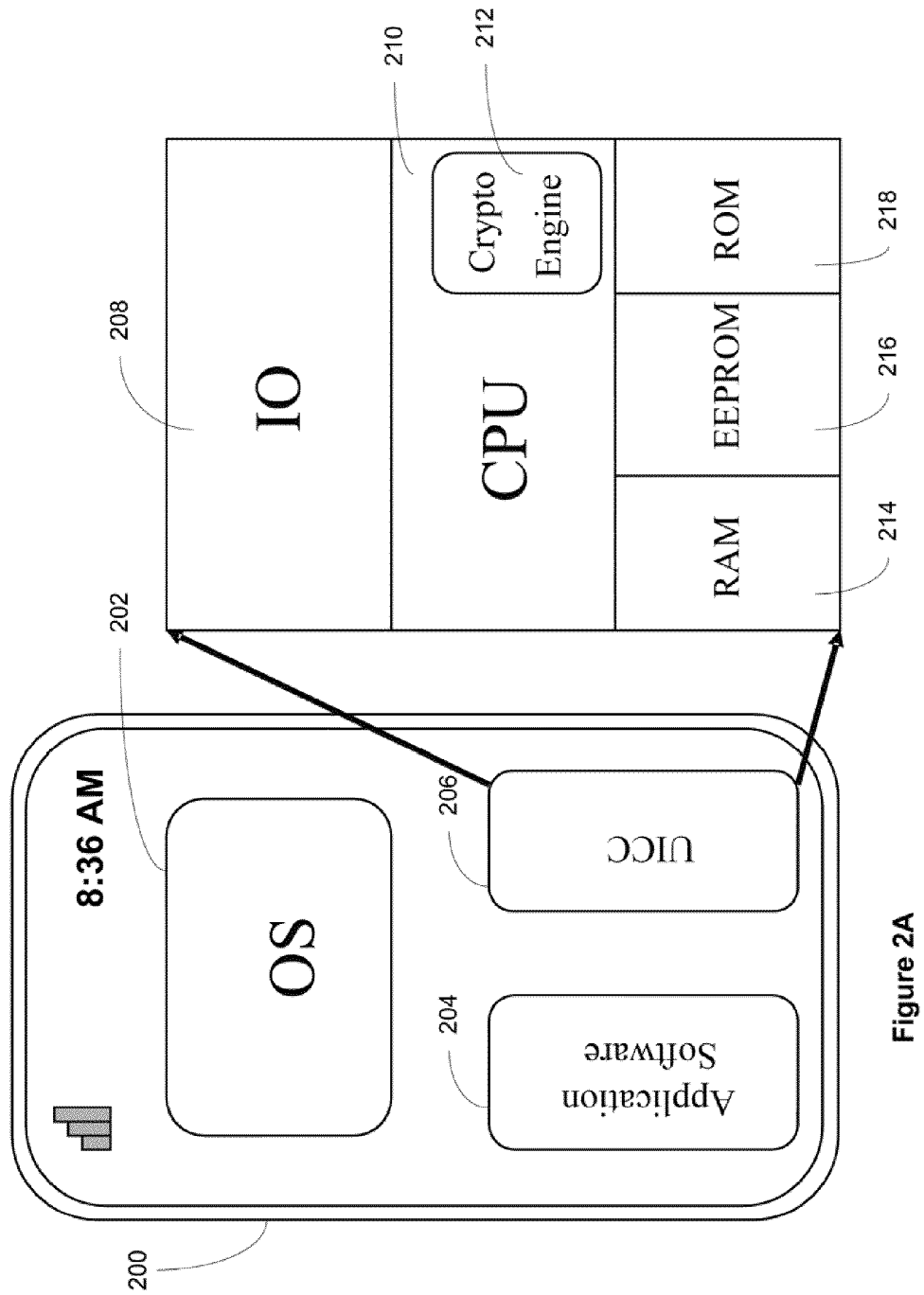
FIG. 2A illustrates components of a mobile client device according to embodiments of the present invention.

FIG. 2A illustrates key components of a mobile client device according to embodiments of the present invention. As shown in FIG. 2, mobile client device 200 includes an operating system (OS), software application programs, and a UICC 206. The UICC 206 may further include an input/output (IO) block, a central processing unit (CPU) 210 and its associated RAM 214, EEPROM 216, and ROM 218. The CPU also includes a crypto engine 212.

According to embodiments of the present invention, the UICC (Universal Integrated Circuit Card) may be implemented as a smart card used in mobile terminals in GSM and UMTS networks. The UICC ensures the integrity and security of all kinds of personal data, and it typically holds a few hundred kilobytes. In 2G networks, the SIM card and SIM application are bound together, so that a SIM Card could mean the physical card, or any physical card with the SIM application. In 3G networks, applications are run on a UICC card. The UICC smart card includes a CPU, ROM, RAM, EEPROM and I/O circuits. The use and content of the card may be protected by use of PIN codes. One code, PIN1, can be defined to control normal use of the phone. Another code, PIN2, can be set, to allow the use of special functions (like limiting outbound telephone-calls to a list of numbers). PUK1 and PUK2 may be used to reset PIN1 and PIN2 respectively. The integration of the ETSI framework and the Application management framework of Global Platform is standardized in the UICC configuration.

Figure 2B:
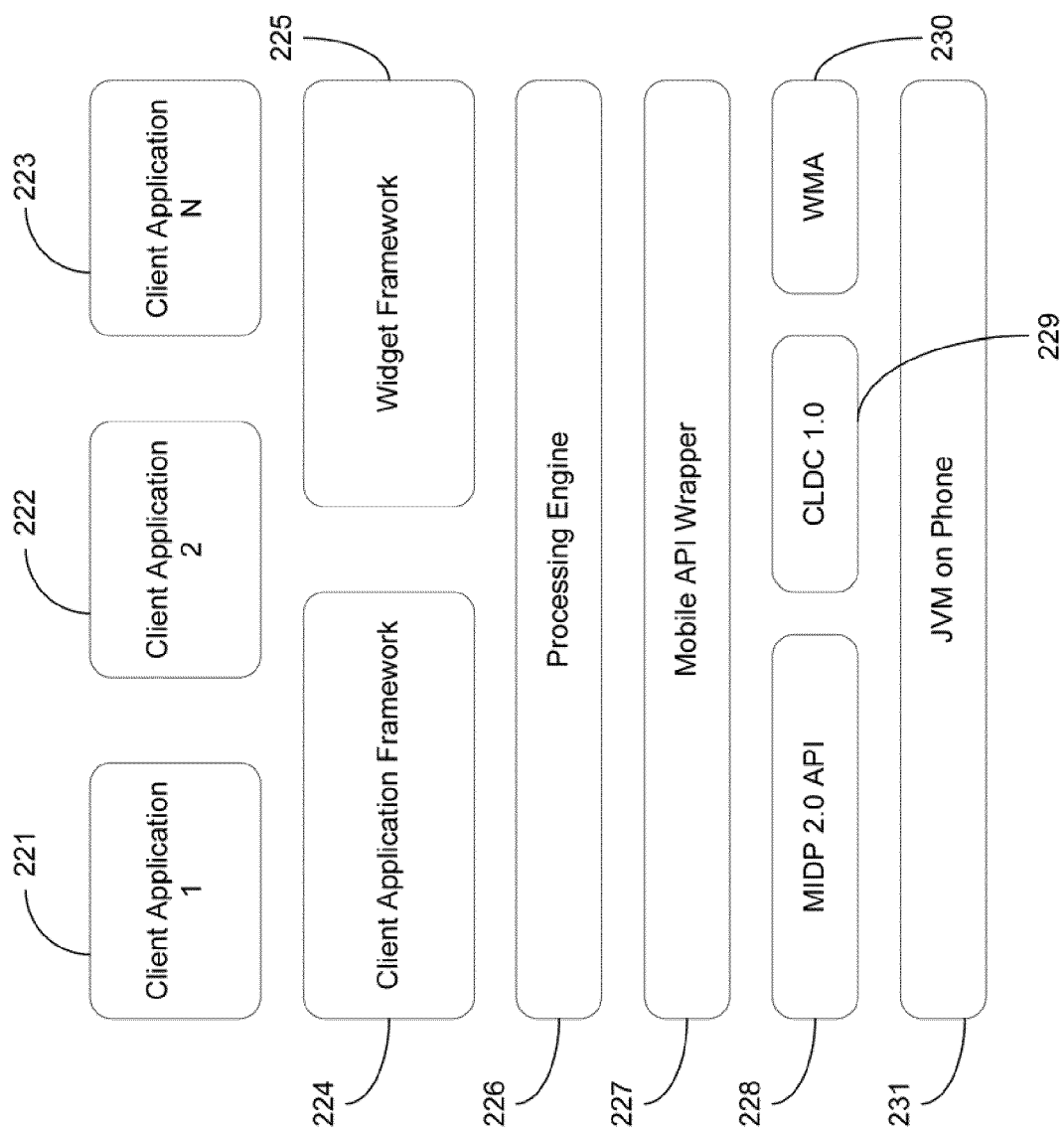
FIG. 2B illustrates software components of a mobile client according to embodiments of the present invention.

FIG. 2B illustrates software components of a mobile client according to embodiments of the present invention. As shown in FIG. 2B, software components of the mobile client include a set of client applications, for example client application 1 (221), client application 2 (222) to client application N (223). The mobile client software components further include a client application framework 224, a widget framework 225, an optimized binary processing engine 226, a mobile API (application program interface) wrapper 227, a MIDP2.0 API 228, a CLDC1.0 229, a WMA 230, and a JVM on phone 231. According to embodiments of the present invention, the client application framework 224 provides a framework to create client applications. The widget framework 225 may be used to create weather, news, finance, games, shopping, and portal discovery widgets, which may be built-in widgets that come with the application or mobile device. The optimized binary processing engine 226 runs client application scripts and widget scripts in binary format. The mobile application programming interface (API) wrapper 227 provides a layer of abstraction on mobile API for creating a platform independent environment. The MIDP2.0 API 228 provides the Mobile Information Device Profile 2.0 API on Java mobile devices. The CLDC1.0 229 provides the Connected Limited Device Configuration API on Java mobile devices. The WMA 230 provides the Wireless Messaging API on Java mobile devices. The JVM on Phone 231 provides the Java Virtual Machine on Java mobile devices.

Figure 3:
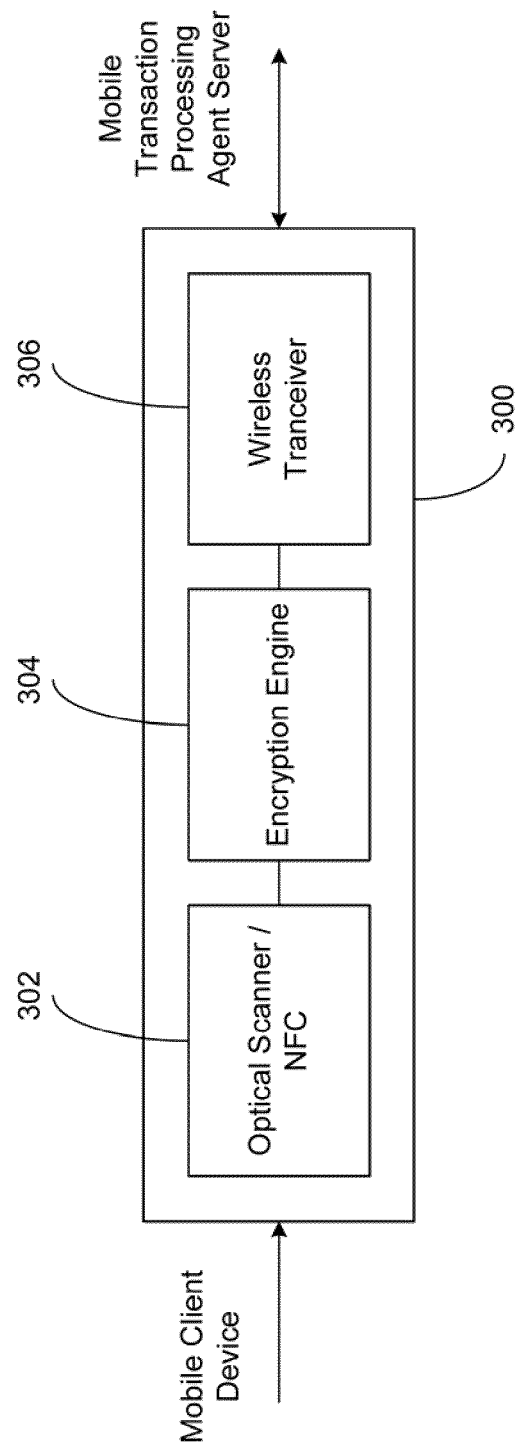
FIG. 3 illustrates components of a POS device according to embodiments of the present invention.

FIG. 3 illustrates components of a POS device according to embodiments of the present invention. As discussed above in association with FIG. 1A, a POS device can be configured to receive information from a mobile client, and send that mobile client information along with other information provided by the merchant to a mobile transaction processing agent located remotely. As shown in FIG. 3, POS device 300 includes an optical scanner or near field communication (NFC) device 302, an encryption engine 304, and a wireless transceiver 306. According to embodiments of the present invention, a NFC device is a short-range high frequency wireless communication device configured to exchange data between devices about a 10 centimeter distance. The technology is an extension of the ISO/IEC 14443 proximity-card standard (contactless card, RFID) that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment.

FIGS. 4A-4C illustrate applications of a mobile transaction processing agent according to embodiments of the present invention. As shown in FIG. 4A, mobile transaction processing agent (MTPA) server 400 is communicatively coupled to a mobile payer device 402 and a mobile payee device 404, respectively. Both the mobile payer device 402 and the mobile payee device 404 may have their own funding sources, respectively. For example, Funding Source 1 (406) is associated with the mobile payer device 402, and Funding Source N (408) is associated with the mobile payee device 404.

FIG. 4B illustrates an exemplary transaction processed by a MTPA according to embodiments of the present invention. In block 410, the MTPA server 400 (also referred to as MTPA for short) receives a payment request from a mobile payer device 402 (also referred to as the payer for short). In block 412, the MTPA server 400 verifies the payer account information in association with the payment request. The payer account information may be previously established between the MTPA and the payer, and money may be deposited by the payer in its account with the MTPA. In block 414, upon verifying the payer account information, the MTPA acknowledges the payment request by sending an acknowledgement to the payer. In block 416, the MTPA receives a digital signature from the payer, which is used to authenticate the transaction. Alter authenticating the transaction with the received digital signature, the MTPA debits the payer's account with the transaction amount. In block 418, the MTPA sends a transaction receipt to the payer, and concludes the transaction.

FIG. 4C illustrates another exemplary transaction processed by a MTPA according to embodiments of the present invention. In block 420, the MTPA server receives a payment request from a mobile payee device 404 (also referred to as the payee for short). Note that in this case, there is a transaction between the payer and payee, and the MTPA serves as a processing agent to facilitate the transaction. Prior to the transaction, both the payer and the payee have established accounts with the MTPA, and money may be deposited by the payer in its account with the MTPA. The payment request from the payee includes the payer information. In block 422, the MTPA verifies the payer account information in association with the payment request. In block 424, upon verifying the payer account information, the MTPA processes the payment request by sending a request for digital signature to the payer. In block 426, the MTPA receives a digital signature from the payer, which is used to authenticate the transaction. After authenticating the transaction with the received digital signature, the MTPA debits the payer's account and credits the payee's account with the transaction amount. In block 428, the MTPA sends a transaction receipt to both the payer and the payee, and concludes the transaction.

Figure 5A:
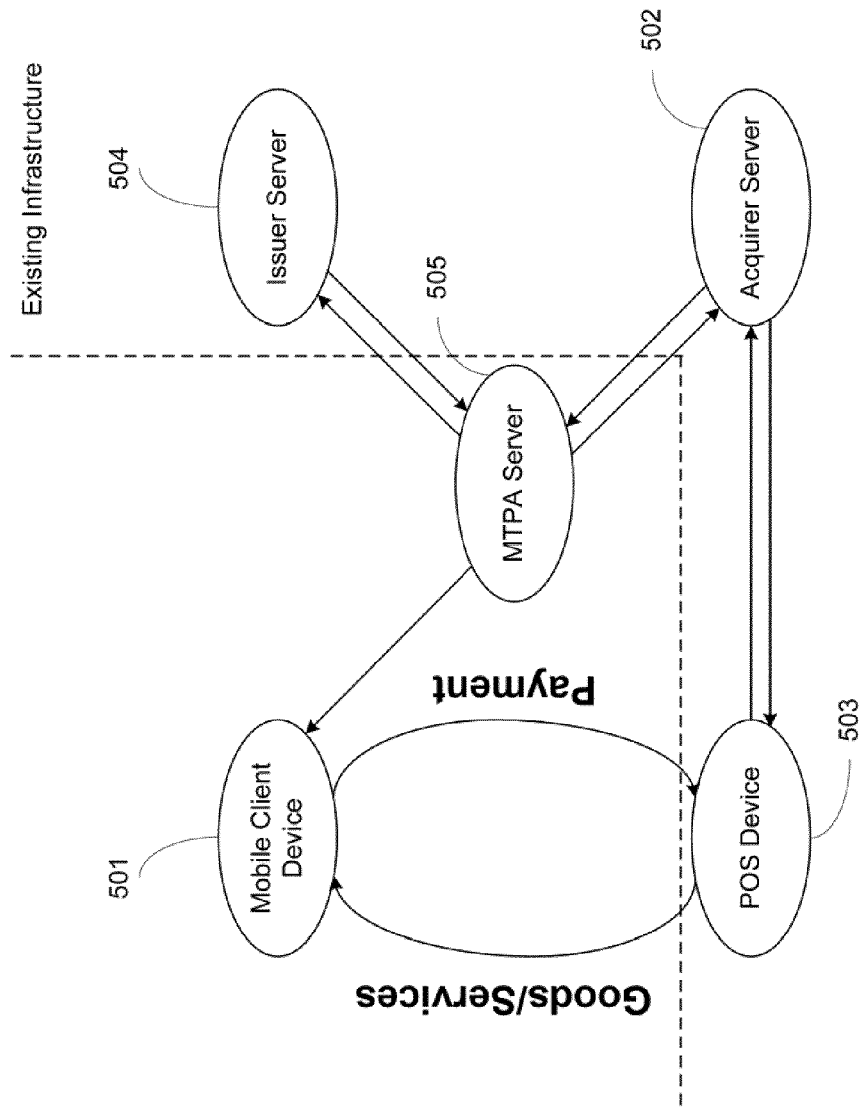
FIGS. 5A-5B illustrate a system for deploying mobile client, POS device, and MTPA with existing financial infrastructures according to embodiments of the present invention.
Figure 5B:
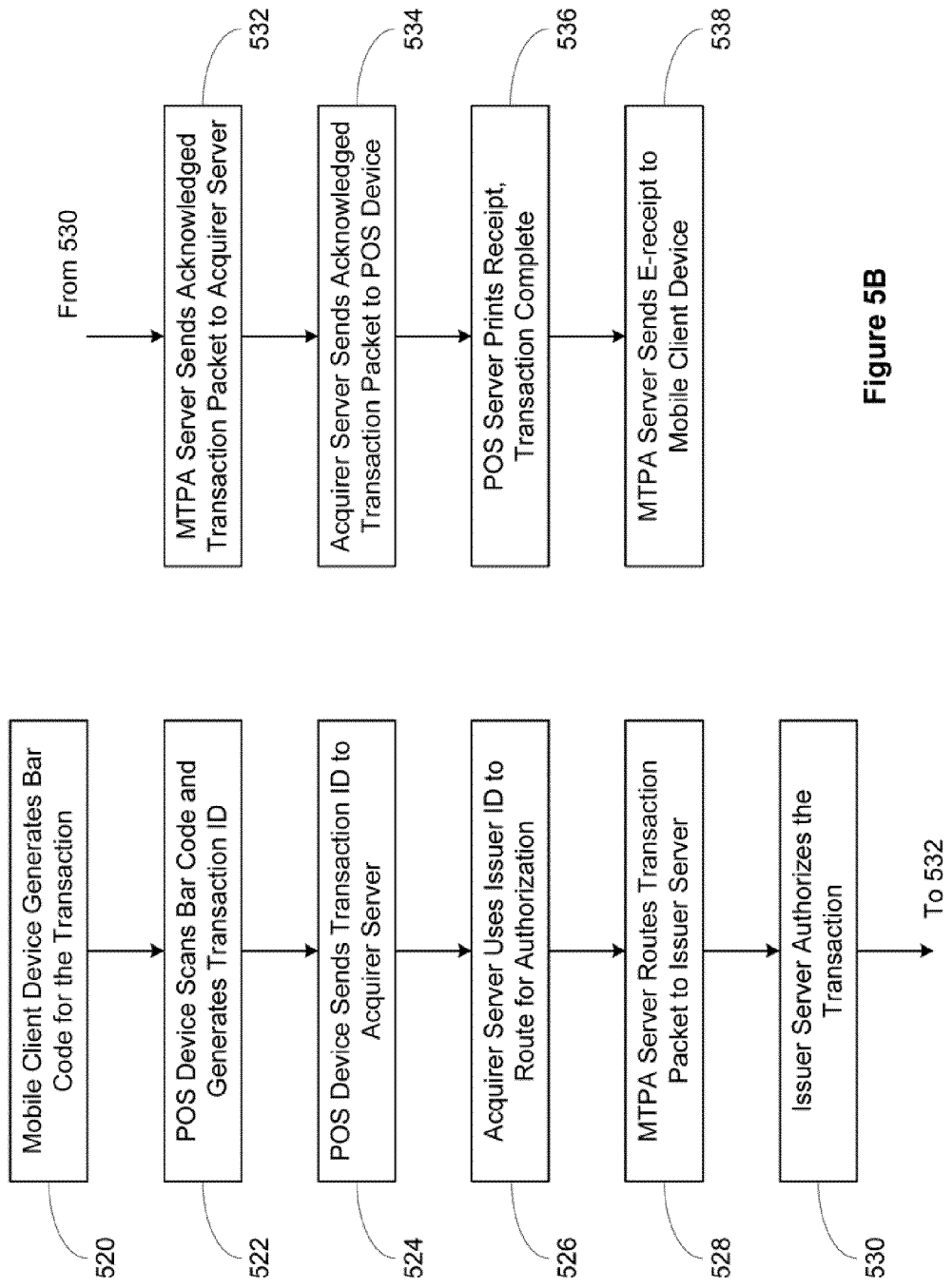

FIGS. 5A-5B illustrate a system for deploying mobile client, POS device, and MTPA with existing financial infrastructures according to embodiments of the present invention. As shown in FIG. 5A, mobile client device 501, POS device 503, and MTPA server 505 may be configured to work with one or more acquirer servers 502 and one or more issuer servers 504.

According to embodiments of the present invention, an acquirer (or acquiring bank) is a member of a card association, for example MasterCard and/or Visa, which maintains merchant relationships and receives all bankcard transactions from the merchant. In a credit card transaction, the acquirer is the entity that receives an authorization request from its merchant accepting the card as a form of payment and forwards it through various authorization networks to the Issuing Bank ("Issuer"). The Issuer determines whether to approve or decline the sale, since they are the entities actually extending credit to their cardholders. An acquiring bank (or acquirer) is the bank or financial institution that accepts payments for the products or services on behalf of a merchant. The term acquirer indicates that the bank accepts or acquires transactions performed using a credit card issued by a bank other than itself. According to embodiments of the present invention, an issuing bank is a bank that offers card association branded payment cards directly to consumers. In the case of credit cards, the issuing bank extends a line of credit to the consumer. Liability for non-payment is then shared by the issuing bank and the acquiring bank, according to rules established by the card association brand.

FIG. 5B illustrates an exemplary flow chart for the system of FIG. 5A according to embodiments of the present invention. In block 520, the mobile client device 501 generates a bar code for a transaction. In block 522, the POS device 503 scans bar code displayed by the mobile client 501 and generates a transaction ID. The transaction ID may include Issuer ID, Account ID, Merchant ID, time stamp, and transaction amount. In block 524, the POS device 503 sends the transaction ID to the acquirer server 502. In one approach, the mechanism for sending the transaction ID may employ a wireless transmission. In another approach, the mechanism for sending the transaction ID may employ a public switched data network (PSDN) or a local area network (LAN).

According to embodiments of the present invention, the POS device 503 may secure the transaction ID using a secure socket layer (SSL) protocol or using a Derived Unique Key Per Transaction (DUKPT) key management scheme. Note that the Secure Sockets Layer (SSL) and the Transport Layer Security (TLS) are cryptographic protocols that provide security for communications over networks such as the Internet. TLS and SSL encrypt the segments of network connections at the Transport Layer end-to-end. Several versions of the protocols are in use in applications like web browsing, electronic mail, Internet faxing, instant messaging and voice-over-IP (VoIP).

In addition, DUKPT is a key management scheme in which for every transaction, a unique key is used which is derived from a fixed key. Therefore, if a derived key is compromised, future and past transaction data are still protected since the next or prior keys cannot be determined easily. DUKPT allows the processing of the encryption to be moved away from the devices that hold the shared secret. The encryption is done with a derived key, which is not re-used after the transaction. DUKPT is used to encrypt electronic commerce transactions. While it can be used to protect information between two companies or banks, it is typically used to encrypt PIN information acquired by Point-Of-Sale (POS) devices.

The DUKPT scheme enables both originating and receiving parties to be in agreement as to the key being used for a given transaction. Each transaction will have a distinct key from all other transactions, except by coincidence. If a present key is compromised, past and future keys (and thus the transactional data encrypted under them) remain uncompromised. Each device generates a different key sequence. Originators and receivers of encrypted messages do not have to perform an interactive key-agreement protocol beforehand.

In block 526, the acquirer server 502 uses an issuer ID embedded in the transaction ID to route the transaction via the MTPA server 505 to the issuer server 504 for authorization. In one approach, the Acquirer server 502 appends its own Acquirer ID with the transaction ID and forwards it to the MTPA server 505 or other processing agents. The routing may use a wide area network (WAN) with a variety of security schemes, such as the Internet Protocol Security (IPsec), the Triple Data Encryption Standard (3DES), or the Advanced Electronic Signature (AES). The destination may be the MTPA server 505.

According to embodiments of the present invention, IPsec is a protocol suite for securing Internet Protocol (IP) communications by authenticating and encrypting each IP packet of a data stream. IPsec may also includes protocols for establishing mutual authentication between agents at the beginning of the session and negotiation of cryptographic keys to be used during the session. IPsec may be used to protect data flows between a pair of hosts (for example computer users or servers), between a pair of security gateways (for example routers or firewalls), or between a security gateway and a host. IPsec is a dual mode, end-to-end, security scheme operating at the Internet Layer of the Internet Protocol Suite or OSI model Layer 3. Some other Internet security systems in use, such as Secure Sockets Layer (SSL), Transport Layer Security (TLS) and Secure Shell (SSH), operate in the upper layers of these models. Hence, IPsec can be used for protecting any application traffic across the Internet. Applications need not be specifically designed to use IPsec. The use of TLS/SSL may typically be incorporated into the design of applications.

According to embodiments of the present invention, 3DES is a common name for the Triple Data Encryption Algorithm (TDEA) block cipher, which applies the Data Encryption Standard (DES) cipher algorithm three times to each data block. 3DES provides a method of increasing the key size of DES to protect against brute force attacks, without requiring a completely new block cipher algorithm.

According to embodiments of the present invention, an electronic signature is any legally recognized electronic means that indicates that a person adopts the contents of an electronic message. One definition of electronic signature may be an electronic sound, symbol, or process, attached to or logically associated with a contract or other record and executed or adopted by a person with the intent to sign the record. It may be an electronic transmission of the document which contains the signature, as in the case of facsimile transmissions, or it may be encoded message, such as telegraphy using Morse code. Increasingly, encrypted digital signatures are used in e-commerce and in regulatory filings as digital signatures are more secure than a simple generic electronic signature.

In block 528, the MTPA server 505 routes the transaction packet to the issuer server 504. In one approach, the MTPA server 505 decrypts the account ID, performs checks on identity and validity of accounts, and routs the account ID and transaction dollar amount to the issuer server 504 for further validation and authorization. In block 530, the issuer server 504 authorizes the transaction. According to an exemplary implementation, the Issuer server 504 validates the account ID, performs the payment transaction, and appends transaction packets with an authentication/acknowledge field, and sends the authorization to the MTPA server 505.

In block 532, the MTPA server 505 sends an acknowledged transaction packet to the acquirer server 502. Similar to block 526, the transmission mechanism may use WAN with IPSEC, 3DES, or AES. In addition, the transaction packet may include an appended acknowledgement receipt. In block 534, the acquirer server 502 sends the acknowledged transaction packet to the POS device 503. Similar to the block 524, the transmission may use wireless/LAN/PSDN, and the security may employ SSL/DUKPT. In block 536, the POS device 503 prints a receipt for the mobile client device 501. In block 538, the MTPA 505 sends an electronic receipt to the mobile client device 501, for example via a Short Message Service (SMS), and the transaction is completed.

According to embodiments of the present invention, a SMS is a communication service standardized in the GSM mobile communication system, using standardized communications protocols allowing the interchange of short text messages between mobile telephone devices. Messages are sent to a Short Message Service Centre (SMSC) which provides a store-and-forward mechanism. It attempts to send messages to their recipients. If a recipient is not reachable, the SMSC queues the message for later retry. Transmission of short messages between the SMSC and the mobile device is performed using. the Mobile Application Part (MAP) of the SS7 protocol. Messages are sent with the MAP mo-ForwardSM and mt-ForwardSM operations, whose payload length is limited by the constraints of the signaling protocol to precisely 140 octets (140 octets=140*8 bits=1120 bits). Short messages can be encoded using a variety of alphabets: the default GSM 7-bit alphabet, the 8-bit data alphabet, and the 16-bit UTF-16 alphabet. Depending on which alphabet the subscriber has configured in the mobile device, this leads to the maximum individual Short Message sizes of 160 7-bit characters, 140 8-bit characters, or 70 16-bit characters, including spaces. Larger content (Concatenated SMS, multipart or segmented SMS or "long SMS") can be sent using multiple messages, in which case each message starts with a user data header (UDH) containing segmentation information. Since UDH is inside the payload, the number of characters per segment is lower: 153 for 7-bit encoding, 133 for 8-bit encoding and 67 for 16-bit encoding. The receiving mobile device is then responsible for reassembling the message and presenting it to the user as one long message. While the standard theoretically permits up to 255 segments, 6 to 8 segment messages are the practical maximum, and long messages are often billed as equivalent to multiple SMS messages.

FIGS. 6A-6B illustrate yet another system for deploying mobile client, POS device, and MTPA with existing financial infrastructures according to embodiments of the present invention. The mobile client device 601, the POS device 603, the MTPA server 605 may be configured as shown in FIG. 6A to work with one or more acquirer servers 602 and one or more issuer servers 604.

In the exemplary implementation shown in FIG. 6B, in block 620, the mobile client device 601 generates a bar code for a transaction. In block 622, the POS device 603 scans the bar code and generates a transaction ID. The transaction ID may include Issuer ID, Account ID, Merchant ID, time stamp, and transaction amount. In block 624, the POS device 603 sends the transaction ID to the MTPA server 605. The sending mechanism may employ LAN, PSDN, or wireless transmission: and the security employed in the transmission may be SSL/DUKPT to encode the transaction ID.

In block 626, the MTPA server 605 uses an issuer ID embedded in the transaction ID to route the transaction via the acquirer server 602 to the issuer server 604 for authorization. The MTPA decrypts the account ID, performs checks on identity and validity of accounts, and routs the account ID and transaction dollar amount via the acquirer server 602 to the issuer server 604 for further validation and authorization.

In block 628, the acquirer server 602 routes the transaction packet to the issuer server 604. The acquirer server may append its own Acquirer ID with the transaction ID and forwards it to the issuer server 604. According to embodiments of the present invention, the routing may use WAN with IPSEC/3DES/AES. In block 630, the issuer server 604 authorizes the transaction. In particular, the issuer server 604 validates the account ID, performs the needed payment transaction, appends transaction packets with authentication/acknowledge field, and sends the authorization to the acquirer server 602.

In block 632, the acquirer server 602 sends an acknowledged transaction packet to the MTPA server 605. The transmission mechanism may use WAN with IPSEC/3DES/AES; and the transaction packet may include an appended acknowledgement receipt. In block 634, the MTPA server 605 sends the acknowledged transaction packet to the POS device 603. The transmission may use LAN, PSDN, or wireless transmission, and the security may employ SSL/DUKPT. In block 636, the POS device 603 prints a receipt for the mobile client device 601. In block 638, the MTPA 605 sends an electronic receipt to the mobile client device 601, and the transaction is completed.

Figure 7A:
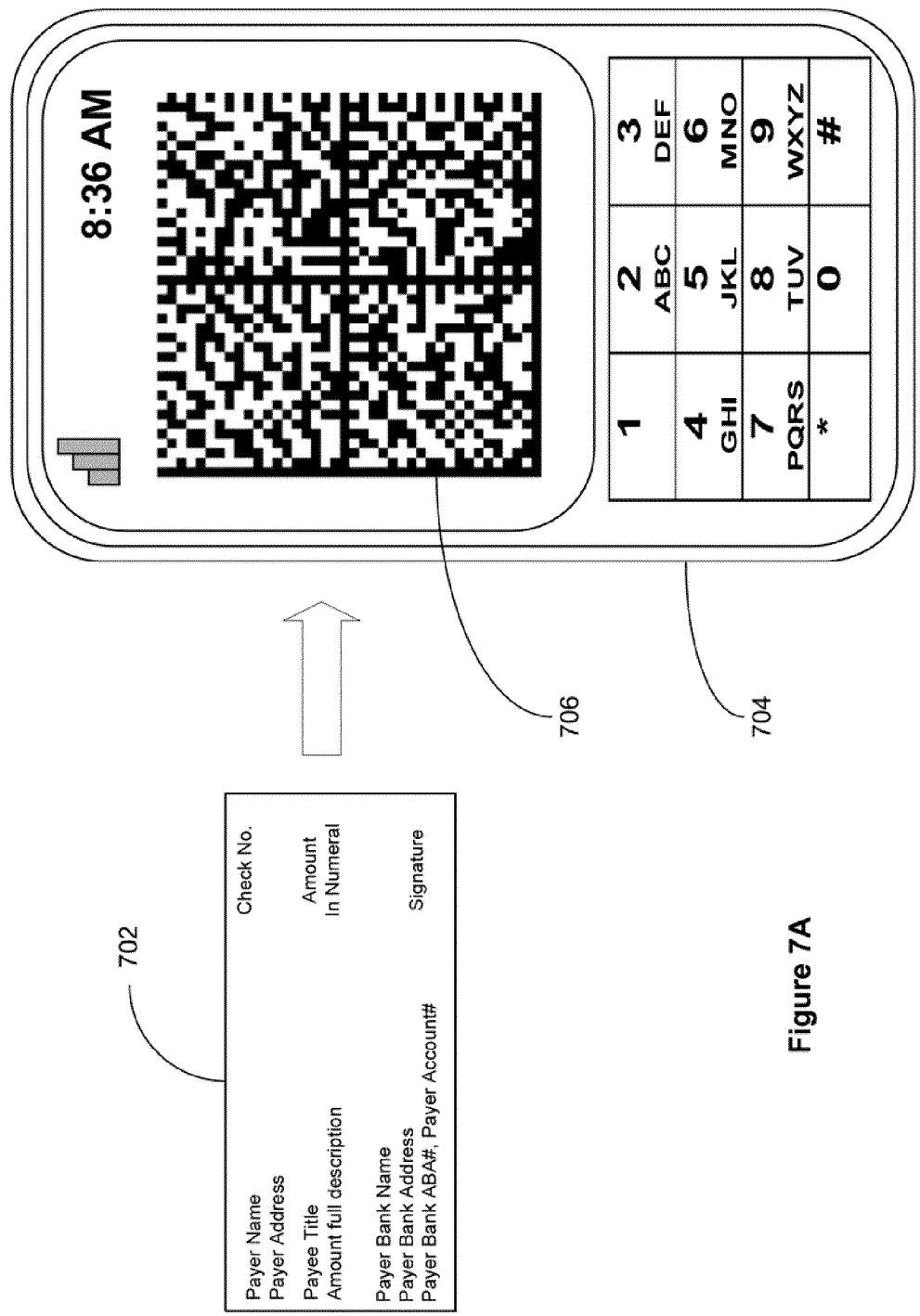

FIGS. 7A-7C illustrate implementations of processing a mobile check according to embodiments of the present invention. In the example shown in FIG. 7A, a check 702 may include payer information such as name and address of the payer, date the check is written, dollar amount of the transaction, payer's bank name, address and ABA number, and the payer's account number. A mobile client device 704 includes an application program that takes in the above information of a conventional paper check and generates a bar code pattern 706 (also referred to as security stamp) that can be transmitted to a payer device, and subsequently to any processing center in a secured manner. In one approach, to generate the bar code pattern 706, the application program may use the user ID and time of the transaction as seeds of a random number for generating the bar code pattern 706. In another approach, the application program may use the 10 digit mobile number and time of the transaction as seeds of a random number for generating the bar code pattern 706. In yet another approach, application program may use any combination of the user ID, 10 digit phone number, time of the transaction, and point-of-sale GPS location as seeds of a random number for generating the bar code pattern 706. With such a secured encoding, only the payee's bank can authenticate that the security stamp is created by the payee using the payee's user ID, and perform verification and acknowledgement of this secured transaction.

FIGS. 7B and 7C illustrate transaction flow in processing a mobile check according to embodiments of the present invention. As shown in FIG. 7B, the transaction flow includes payer device 710, payee device 712, payee's clearing bank server 714, and payer's bank server 716. In the case where the payer and payee use the same bank, the payee's clearing bank server 714 and the payer's bank server 716 may be implemented with the same group of servers. FIG. 7C illustrates how the devices and servers of FIG. 7B interact with each other according to embodiments of the present invention. In 720, payer device 710 generates a mobile check in the form of bar code which encodes check payment information. In 722, payee device 712 scans in the mobile check, and decodes the barcode. The scanning may be performed using a phone camera, or using conventional scanner of a cash register. In 724, the payee device 712 sends decoded information to payee's clearing bank server 714. In 726, the payee clearing bank server 714 forwards the payment information of the mobile check to payer's bank server 716. In 728, payer's bank server 716 verifies the authenticity of the payment information of the mobile check through account information validation as well as security stamp validation. In 730, payer's bank server 716 completes the transaction and sends an acknowledge receipt to the payer device 710.

According to some aspects of the disclosure, the payer may set threshold amounts in the payer device for different types of transactions. Similarly, the payer's bank may also set threshold transaction amounts for different types of transactions in the payer's bank server. In this manner, to process a particular transaction, if the transaction amount is larger than the preset threshold amount, the payer's bank server 716 sends a request to the payer device 710 and waits for the payer's confirmation before it releases the fund and completes the transaction. Upon completion of the transaction, the payee's clearing bank server may send a transaction acknowledge receipt to the payee device 712.

FIG. 8 illustrates a method of security enhancement and book keeping according to embodiments of the present invention. In the exemplary method shown in FIG. 8, each payment transaction can have transaction record sent to payer's phone through SMS or email or web messaging protocol. In addition to transaction date, post date, reference number, description of transaction, and amount of each transaction, a transaction record 800 can include point-of-sale GPS location information. The client device can be configured to save each transaction into a transaction record database. Using the transaction record, the payer can verify the validity of each transaction by clicking on the location field (GPS coordinates) and see the location where the transaction occurred. The client device can also be configured to allow the payer to view a group of transactions within a specified period showing on a map with markings of the locations of the corresponding transactions. Markings of locations that are outside of the payer's activity scope can be identified and reported as potentially fraudulent activities.

For example, transactions 804, 806, and 810 occurred in northern California, while transaction 808 occurred in Las Vegas, Nev. The method checks the GPS locations of the client device during the period of transactions. If there is a discrepancy between any of the transactions and the actual GPS locations of the client device around the time and date of the transactions, the client device can be configured to issue a notification, in the form of generating instant message, email, ringtone, or vibration to notify the user. In this example, assuming the user was in northern California and did not go to Las Vegas, a timely notification to the user can allow the user to address the issue as soon as possible.

In conventional methods, a user is provided with his transaction record in batch mode, for example once a month though paper statements, or through online accesses by the user periodically. Weeks after the transactions have occurred; some users may no longer remember certain transactions, despite the transaction records have provided them with information such as date, company name, city, state, and amount of the transaction. This problem is address by the present disclosure. Using the POS GPS locations provided in the transaction record, the client device can be configured to allow the user to view the location on a map, or view a photo of the business where the transaction occurred. Thus, enhancement in monitoring the transaction record can help fraud identification and loss avoidance, which result in better security and higher integrity of the disclosed mobile payment system.

Figure 9:
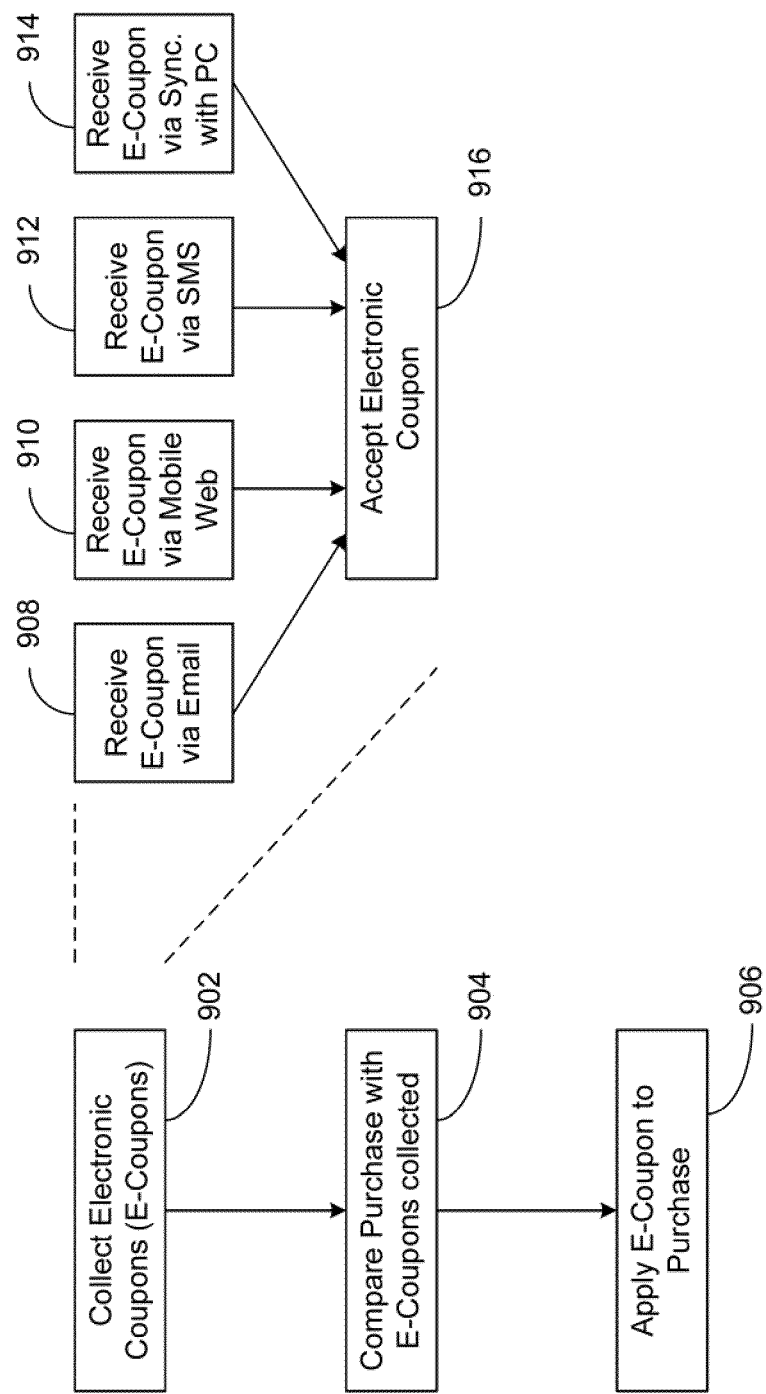
FIG. 9 illustrates a method of using electronic coupon according to embodiments of the present invention.

FIG. 9 illustrates a method of using electronic coupon according to embodiments of the present invention. In 902, the client device collects electronic coupons (E-coupons), which may be received via email 908, mobile web 910, SMS 912, or via synchronization with a personal computer 914. In 916, the E-coupons are accepted and stored in a coupon basket in memory of the client device. According to embodiments of the present invention, an E-coupon includes presentation contents and an identification field. The presentation contents includes, but not limited to, merchant name, merchant item, and value of discount offered. The identification field may include a one dimensional or a two dimensional bar code. In one approach, the client device may be configured to store a list of user's favorite merchants. When the user is within a preset proximity (for example 200 yards) of a merchant, the client device may generate a notification to the user about the availability of the merchant's E-coupons.

In 904, when the user is making a purchase, the client device compares the merchant and the item being purchased with the E-coupons collected. In 906, if there is a match, the E-coupon is applied to the purchase as part of the mobile web transaction flow. In one approach, once an identification field is scanned and verified by the merchant, all items purchased by the user can enjoy certain E-coupon subject to the restrictions imposed by the merchant.

In one application, the client device may be configured to receive auto notification of availability of E-coupons from a merchant when the user is within a preset proximity (for example ¼ mile) of the merchant. This is beneficial to both the merchant and the user compared to the traditional public announcement system through merchant's speakers. It allows the merchant to send different users with different E-coupons based on the users' prior purchase history with the merchant. It also allows the merchant to send recommendations to a user based on the user's prior purchase history. For example, if the user has previously purchased diapers, the merchant may recommend E-coupons of infant formulae. In another application, the merchant may send E-coupons to the user based on items the user will purchase. For example, if the user has selected steak, then the merchant may recommend E-coupons for certain red wines; or if the user has selected tortilla chips, the merchant may recommend E-coupons for certain salsas.

According to some aspects of the present disclosure, the client device may be configured to perform auto delete of expired E-coupons according to the corresponding expiration date associated with the E-coupons, which can save the user time by going through and removing expired paper coupons in conventional methods. In addition, according to some aspects of the present disclosure, the client device may be configured to remind the user about expiration of certain E-coupons issued by a list of user's favorite merchants.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A point-of-sale (POS) system, comprising:
    an input module configured to receive a transaction description from a mobile client device, wherein the input module comprises an optical scanner or near field communication device, and wherein the transaction description comprises transaction type, user pin number, issuer ID, account ID, merchant ID, password, transaction amount, transaction time stamp and a POS GPS location of the mobile client device, and wherein the transaction description is presented to the POS system as a one dimensional bar code or a two dimensional bar code;
    an encryption engine configured to generate an encrypted transaction description using the transaction description from the mobile client device, wherein the encryption engine comprises a key management module configured to derive a unique key using the transaction description received from the mobile client, wherein the unique key is not to be reused after the encrypted transaction description is sent for processing; and a communication module configured to transmit the encrypted transaction description for processing.

2. The POS system of claim 1, further comprising:

a purchase processing module configured to handle purchases by the mobile client device in the form of at least one of mobile cash and mobile check.

3. The POS system of claim 2, wherein the purchase processing module comprises:

an electronic coupon (E-coupon) processing module configured to send notification of availability of E-coupons to the mobile client device, wherein the mobile client device is within a preset proximity from the POS system.

4. The POS system of claim 3, wherein the electronic coupon processing module is configured to send different mobile client devices with different E-coupons based on the mobile client devices' prior purchase histories stored at the POS system.

5. The POS system of claim 3, wherein the electronic coupon processing module is configured to send E-coupons based on items in the shopping basket of the mobile client device.

6. The POS system of claim 1, wherein the communication module comprises:

logic configured to transmit via wireless, LAN, WAN, and PSDN communication networks.

7. The POS system of claim 1, wherein the input module is configured to exchange data with the mobile device wirelessly within ten centimeters of distance.

8. The POS system of claim 1, wherein the communication module further comprises:

logic configured to receive an acknowledgement transaction packet from a mobile transaction processing agent; and logic configured to generate a receipt based on the acknowledgement transaction packet received.

9. The POS system of claim 1, further comprising: logic configured to provide a POS GPS location as a transaction record to assist a user to identify a corresponding transaction location when reviewing a history of prior transactions made by the user.

10. A computer implemented method for processing secured transactions, comprising:

receiving a transaction description from a mobile client device at an input module of a point-of-sale (POS) system, wherein the input module comprises an optical scanner or near field communication device, and wherein the transaction description comprises transaction type, user pin number, issuer ID, account ID, merchant ID, password, transaction amount, transaction time stamp and a POS GPS location of the mobile client device, and wherein the transaction description is presented to the POS system as a one dimensional bar code or a two dimensional bar code;

generating an encrypted transaction description at an encryption engine of the point-of-sale system using the transaction description from the mobile client device, wherein generating an encrypted transaction description comprises deriving a unique key using the transaction description received from the mobile client, wherein the unique key is not to be reused after the encrypted transaction description is sent for processing; and transmitting the encrypted transaction description for processing using a communication module of the point-of-sale system.

11. The computer implemented method of claim 10, further comprising:

handling purchases from the mobile client device in the form of at least one of mobile cash and mobile check.

12. The computer implemented method of claim 11, wherein handling purchases comprises:

sending notification of availability of E-coupons to the mobile client device, wherein the mobile client device is within a preset proximity.

13. The computer implemented method of claim 12, wherein sending notifications comprises sending different mobile client devices with different E-coupons based on the mobile client devices' prior purchase histories.

14. The computer implemented method of claim 12, wherein sending notifications comprises sending E-coupons based on items in the shopping basket of the mobile client device.

15. The computer implemented method of claim 10, wherein transmitting the encrypted transaction description comprises:

transmitting via wireless, LAN, WAN, and PSDN communication networks.

16. The computer implemented method of claim 10, wherein the input module is configured to exchange data with the mobile device wirelessly within ten centimeters of distance.

17. The computer implemented method of claim 10, further comprising:

receiving an acknowledgement transaction packet from a mobile transaction processing agent at the communication module of the POS system; and generating a receipt based on the acknowledgement transaction packet received.

18. The computer implemented method of claim 10, further comprising:

providing a POS GPS location as a transaction record to assist a user to identify a corresponding transaction location when reviewing a history of prior transactions made by the user.

* * * * *